US008724582B2

(12) United States Patent
Yang et al.

(10) Patent No.: US 8,724,582 B2
(45) Date of Patent: May 13, 2014

(54) METHOD AND APPARATUS PROVIDING CONTEXT TRANSFER FOR INTER-PDSN HANDOFFS IN A WIRELESS COMMUNICATION SYSTEM

(75) Inventors: Jianhao Michael Yang, San Diego, CA (US); Sarvesh Asthana, San Diego, CA (US); Rajeev Koodli, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 10/878,452

(22) Filed: Jun. 28, 2004

(65) Prior Publication Data

US 2005/0286469 A1    Dec. 29, 2005

(51) Int. Cl.
*H04W 4/00* (2009.01)
*H04W 36/02* (2009.01)
*H04W 36/22* (2009.01)
*H04W 36/38* (2009.01)

(52) U.S. Cl.
CPC ........... *H04W 36/02* (2013.01); *H04W 36/22* (2013.01); *H04W 36/38* (2013.01)
USPC ................ 370/331; 455/436; 455/442

(58) Field of Classification Search
CPC ..... H04W 36/00; H04W 36/02; H04W 36/04; H04W 36/06; H04W 36/08; H04W 36/10; H04W 36/12; H04W 36/14; H04W 36/16; H04W 36/18; H04W 36/20; H04W 36/22; H04W 36/24; H04W 36/26; H04W 36/28; H04W 36/30; H04W 36/32; H04W 36/34; H04W 36/36; H04W 36/38
USPC ........................ 455/436–444; 370/331–333

See application file for complete search history.

(56) References Cited

U.S. PATENT DOCUMENTS

| | | | |
|---|---|---|---|
| 6,487,406 B1 | 11/2002 | Chang et al. ................. | 455/426 |
| 6,799,039 B2 * | 9/2004 | Wu et al. ...................... | 455/436 |
| 6,956,846 B2 * | 10/2005 | Lewis et al. .................. | 370/352 |
| 7,050,793 B1 * | 5/2006 | Kenward et al. ............ | 455/414.4 |
| 8,145,217 B2 * | 3/2012 | Wang et al. .................. | 455/436 |
| 2002/0021681 A1 * | 2/2002 | Madour ........................ | 370/331 |
| 2003/0053429 A1 | 3/2003 | Choi et al. ................... | 370/331 |
| 2003/0067896 A1 * | 4/2003 | Chuah et al. ................ | 370/331 |
| 2004/0081118 A1 | 4/2004 | Mukherjee et al. .......... | 370/328 |
| 2004/0090937 A1 * | 5/2004 | Chaskar et al. ............. | 370/331 |
| 2005/0265284 A1 * | 12/2005 | Hsu et al. .................... | 370/331 |
| 2008/0037548 A1 * | 2/2008 | Yi et al. ....................... | 370/394 |

FOREIGN PATENT DOCUMENTS

EP          0 917 328 A2    5/1999
WO        WO 01/31963 A1    5/2001

OTHER PUBLICATIONS

Koodli, et al., "Fast Handovers and Context Transfers in Mobile Networks", Computer Communication Review, publ. of ACM SIGCOMM, vol. 31, No. 5, Oct. 2001, 11 pgs.

(Continued)

*Primary Examiner* — Ajit Patel
(74) *Attorney, Agent, or Firm* — Harrington & Smith

(57) ABSTRACT

In an exemplary embodiment of this invention contexts are transferred at an appropriate time depending on the context type. As a result, link layer (PPP) delay can be substantially eliminated during Mobile IP handoff, without introducing additional packet loss. By way of example, all MS contexts (both static and dynamic) are maintained during the inter-PDSN handoff procedure, and any executing applications are not impacted by the inter-PDSN handoff.

9 Claims, 5 Drawing Sheets

(56) References Cited

OTHER PUBLICATIONS

Koodli, et al., "Fast Handovers for Mobile IPv6", Jan. 30, 2004, pp. 1-38.

3GPP2 X.S0011-003-C, "cdma 2000 Wireless IP Network Standard: Packet Data Mobility and Resource Management", Version 1.0.0, Aug. 2003, 30 pgs.

3GPP2 X.S0011-002-C, "cdma2000 Wireless IP Network Standard: Simple IP and Mobile IP Access Services" Version 1.0.0, Aug. 2003, 44 pgs.

3GPP2 A.S0013-A, "Interoperability Specification (IOS) for cdma2000 Access Network Interfaces-Part 3 Features", Version 2.0.1, Jul. 2003, 338 pgs.

Perkins, C., IP Mobility Support for IPv4, Jan. 2002, pp. 1-92.

\* cited by examiner

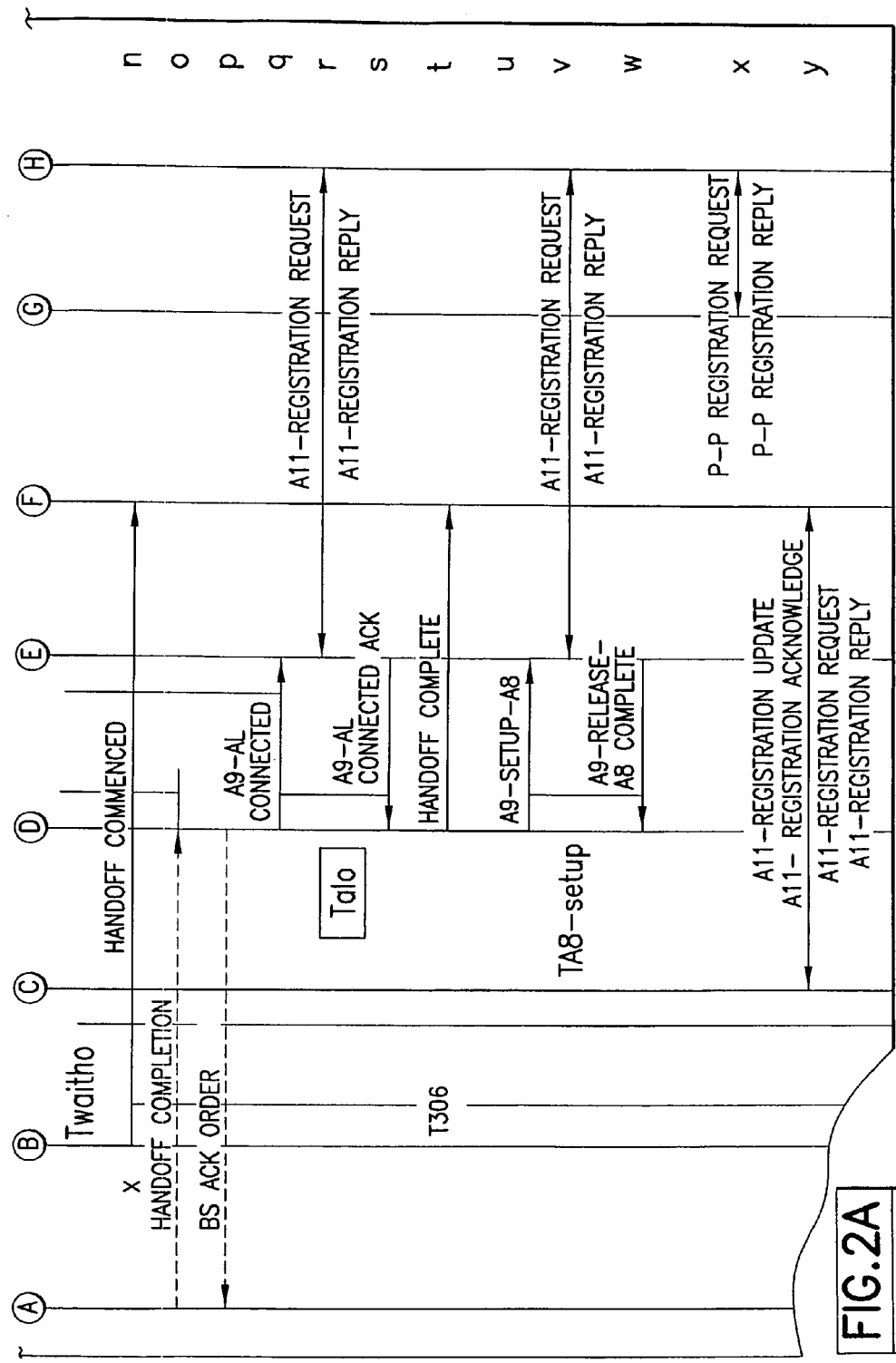

METHOD AND APPARATUS PROVIDING CONTEXT TRANSFER FOR INTER-PDSN HANDOFFS IN A WIRELESS COMMUNICATION SYSTEM

TECHNICAL FIELD

A preferred embodiment of this invention relates generally to methods and apparatus to perform handoffs of a mobile terminal (MT), or mobile node (MN), or mobile station (MS) in a wireless data communications system and, more specifically, relates to methods and apparatus to preserve context during the handoff of the MS.

BACKGROUND

There are number of different potential, handoffs that can occur for a MS. These include, as non-limiting examples, inter-PDSN (Packet Data Service Node) handoffs, inter-BS (Base Station) hard handoffs, inter-BS soft handoffs, and inter-PCF (Packet Control Function) hard handoffs. In each of these different types of handoffs a problem that arises is related to preserving the context of the connection with the MS during the transfer. This invention is directed towards solving the context transfer problems that arise in the inter-PDSN handoff case. Commonly assigned U.S. patent application Ser. No. 10/878,455, filed on even date herewith and entitled "Method and Apparatus Providing Context Transfer for Inter-BS and Inter-PCF Handoffs in a Wireless Communication System", by Sarvesh Asthana and Jianhao Michael Yang, is directed towards solving the context transfer problems that arise in the inter-BS and inter-PCF handoff scenarios, and may thus be considered a related application to this patent application, and is incorporated by reference herein in its entirety.

Internet Protocol (IP) applications in the mobile network require mobility management to maintain session continuity. Mobility management at the IP layer currently depends on the Mobile Ipv4 or Mobile Ipv6 (Mobile IP Version 4, Mobile IP Version 6) specifications. Mobile IP allows an application to maintain the same IP address as it moves from one network/link to another. Thus, the use of Mobile IP obviates the need to re-establish a session whenever the MS moves from one network to another.

However, a Mobile IP handover involves link layer and IP layer signaling, and during this signaling phase the MS cannot send or receive data packets. The resulting delays in packet transmission and/or reception can be large with high latency links, and are generally unacceptable for real-time services where packet loss is very visible to the end-user. Seamless mobility management techniques are generally required for such services.

Seamless mobility management is intended to eliminate service interruption and to reduce packet loss and delay time, and thus increase the quality of service (QoS). The seamless handoff can be achieved through a fast handoff and context transfer.

Generic fast handoff mechanisms can reduce the IP layer signaling delays, and some progress has been made in this area. Generic context transfer protocol has also been proposed. However, there are at two issues that are not yet addressed for the existing context transfer mechanisms. A first issue concerns contexts for real time applications such as VoIP (Voice over Internet Protocol), where time sensitivity of the context transfer is critical. Considerable care must be given to when to transfer these contexts, and how to maintain the accuracy of the contexts during the transfer. A second issue involves the distinction between link layer contexts and IP layer or application contexts. The link layer context is technology-specific, and is normally coupled together with the handoff mechanism for the particular wireless technology. For example, it is the case in a Code Division Multiple Access (CDMA) wireless technology (e.g., CDMA 2000 1x networks) that when the MS performs an inter-PDSN handoff, there are four types of contexts that can be transferred.

1. The first context is a PPP (Point to Point Protocol) context. These are the time insensitive PPP parameters the MS originally negotiated with an anchor PDSN. In this description the anchor PDSN is considered to be the PDSN where the current PPP link is terminated, as contrasted with a Target PDSN, which is the PDSN to which the MS is moving, and that will provide future service for the MS. The PPP context transfer is possible for Mobile IP because the PPP negotiation process does not involve an IP address assignment to the MS, and no authentication between the PDSN and the MS is required. As the parameters exchanged during PPP negotiation are static, time-insensitive parameters there is no need to re-negotiate the PPP session when the PPP end point switches to the target PDSN. The PPP context can be transferred in multiple messages in a way to simulate the PPP negotiation, since the PPP stack is state aware.
2. The second context is the IP layer QoS parameters, such as the Traffic Flow Template (TFT).
3. The third context is Header compression state information, such as ROHC (Robust Header Compression) states.
4. The fourth context of interest is the link layer context in the anchor BS (Base Station). Such context can be the SR_ID, service option configuration, and link layer assisted header compression information. For example, the link layer context can include the state information for LLA-ROHC (Link Layer Assisted-ROHC).

The latter two types of context are time sensitive, meaning that they should be kept updated in order to ensure accuracy.

The following published standards and other documents are related to this invention: 3GPP2 TSG X.P0011.3: Wireless IP Network Standard: Packet Data Mobility and Resource Management; 3GPP2 TSG X.P0011.2: Wireless IP Network Standard: Simple IP and Mobile IP Access Services; 3GPP2 TSG A.S0013-A v2.0.1: 3GPP2 IOP for CDMA2000 Access Network Interface; "Fast Handovers for Mobile IPv6", IETF [mobile-ip] Working Group draft, Rajeev Koodli (Ed.), Jan. 30, 2004; "Fast Handovers and Context Transfers in Mobile Networks", Rajeev Koodli and Charles E. Perkins, Computer Communication Review, a publication of ACM SIGCOMM, volume 31, number 5, October 2001. ISSN # 0146-4833; and RFC3220: IP Mobility Support for IPv4, C. Perkins (Ed.) January 2002.

When a MS is roaming from a BS to another BS, where the new BS cannot reach the serving PDSN, the Mobile IP handoff occurs. In this case the MS needs to obtain a new IP address, maintain the state information for the connection configuration or applications, and update the corresponding node with the new information so that the active service interruption is minimal. However, a conventional generic context transfer mechanism (see again "Fast Handovers and Context Transfers in Mobile Networks", Rajeev Koodli and Charles E. Perkins, ACM SIGCOMM, volume 31, number 5, October 2001) does not address the need to distinguish different types of contexts as to when to transfer context, and how to keep the context updated.

For example, a handoff for VoIP from one PDSN to another PDSN would require the system to transfer the following contexts: PPP context, HRL (Header Reduction Lower) context, HRU (Header Reduction Upper) context and the QoS context, such as the TFT and SR_ID.

A loss of these contexts during the handoff will result in a loss of the QoS and will require a re-negotiation of the QoS. There can be additional delays caused due to re-establishing the contexts (e.g., for QoS or Header compression). These delays can be particularly long when roaming to a slow access network (a high latency link). The seamless handoff also needs to transfer the context at the correct time, and to the correct location.

The P-P interface as defined in 3GPP2 is one attempt to minimize the delay and maintain the contexts when the MS roams from one PDSN to another. This approach creates a tunnel between the anchor PDSN and the target PDSN, when the MS is moving from the anchor PDSN to the target PDSN, and data frames are tunneled through the target PDSN to the anchor PDSN. Packet loss is minimized to the period when the MS performs the actual physical layer switching. Contexts that are maintained by the PDSN are not required to be transferred since, effectively, the serving PDSN is not changed after the handoff. However, this approach has a number of drawbacks.

In the sense of RFC3220 a tunnel is considered to be a path followed by a datagram while it is encapsulated. This model assumes that while it is encapsulated, the datagram is routed to a knowledgeable decapsulation agent, which decapsulates the datagram and then correctly delivers it to its ultimate destination. In this model the PDSNs are considered to be knowledgeable decapsulation agents.

A first drawback of the conventional approach is an increase in the burden on the PDSN, as each service instance for a MS will have one P-P session between the anchor PDSN and the target PDSN for the duration of an active application session. This situation can consume a considerable amount of network resources (e.g., the PDSN memory, processing power, and the bandwidth of the links between the PDSNs).

A second drawback of this approach is an inefficient use of network resources. For example, during a data session each GRE (Generic Routing Encapsulation) packet contains a RLP (Radio Link Protocol) frame which can be in excess of 30 bytes. A large number of small packets are generated and communicated among the IP core network, which does not occur if the P-P interface is disconnected.

A third drawback relates to the required "triangle routing", where IP packets pass through an additional hop between the anchor PDSN and the target PDSN. Ideally, the P-P interface should be released as soon as possible, if such release does not interrupt the application service.

A fourth drawback is that the conventional technique does not actually use the concept of the Mobile IP fast handoff, because the MS does not perform Mobile IP registration for the lifetime of the active connection. The P-P interface procedure therefore cannot be used for an inter-technology handoff.

The generic context transfer mechanism (see again "Fast Handovers and Context Transfers in Mobile Networks", Rajeev Koodli and Charles E. Perkins) does not distinguish between the static and dynamic natures of contexts. It also does not address the use of link layer contexts to reduce link layer setup delay.

It should thus be apparent that there is a need to provide an improved technique for performing inter-PDSN type of handoffs. Prior to this invention, this need was not adequately addressed or fulfilled.

SUMMARY OF THE PREFERRED EMBODIMENTS

The foregoing and other problems are overcome, and other advantages are realized, in accordance with the presently preferred embodiments of these teachings.

One example of this invention provides a method to perform an inter-Packet Data Serving Node (PDSN) handoff for a Mobile Station (MS) from an anchor PDSN to a target PDSN, as well as a PDSN that operates in accordance with the method, and a network that operates in accordance with the method. In the method there is executed, in response to establishing a P-P interface between the anchor PDSN and the target PDSN, where datagrams are tunneled through the target PDSN to the anchor PDSN the MS has an original care-of IP address previously assigned by the anchor PDSN, a procedure of transferring MS static context from the anchor PDSN to the target PDSN, including PPP context; performing a link layer hard handoff of the MS from an anchor radio network associated with the anchor PDSN to a target radio network associated with the target PDSN; and sending a Proxy Router Advertisement message from the target PDSN to the MS through the P-P interface, where the Proxy Router Advertisement message comprising as a care-of-address the IP address of the target PDSN. In response to receiving the Proxy Router Advertisement message at the MS, the method performs a further procedure of performing a Mobile IP Registration with the target PDSN and, in response to fulfilling the Mobile IP Registration Request for the MS, sending the MS a newly assigned care-of address that corresponds to the target PDSN. In response to a first datagram destined for the MS reaching the target PDSN, the method buffers the datagram and transfers dynamic contexts from the anchor PDSN to the target PDSN. The method also activates at the target PDSN the static context previously received from the anchor PDSN, and forwards any buffered datagram to the MS via the target RN in accordance with all MS static and dynamic contexts.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 2A and 2B, collectively referred to as FIG. 2, show a diagram that illustrates the messages that pass between various ones of the network nodes and elements of FIG. 1, in accordance with an inter-PDSN handoff procedure where the anchor PDSN is not reachable from the target PCF;

DETAILED DESCRIPTION OF THE PREFERRED EMBODIMENTS

Figure 1:
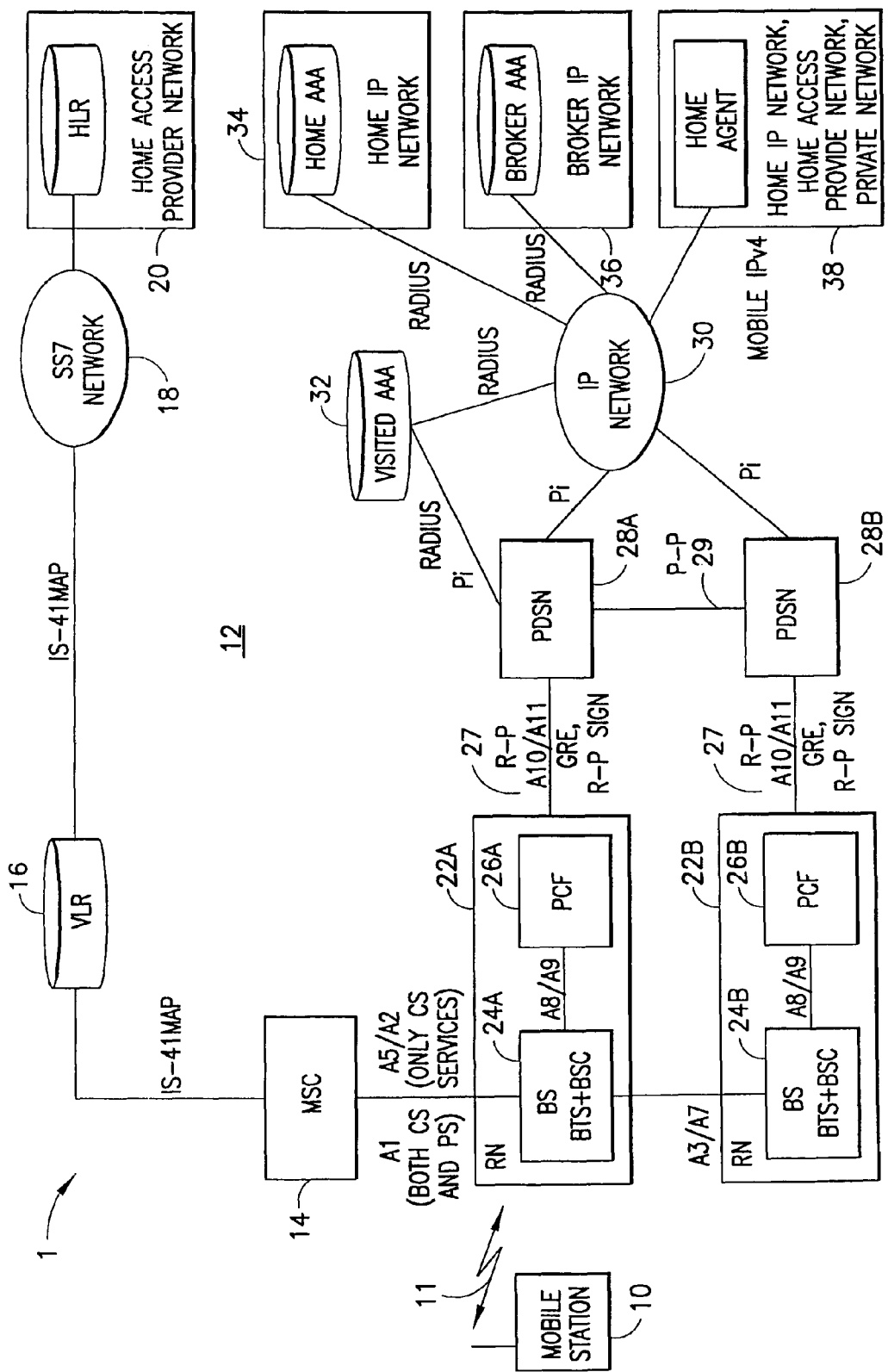
FIG. 1 is simplified block diagram of a wireless communication system, specifically a CDMA 2000 1x network, that is suitable for use in practicing the teachings of exemplary embodiments of this invention.

FIG. 1 is simplified block diagram of a wireless communication system 1, specifically a CDMA 2000 1x network that is suitable for use in practicing the teachings of exemplary embodiments of this invention. A description of FIG. 1 will be provided in order to place this invention into a suitable technological context. However, it should be appreciated that the specific network architecture and topology shown in FIG. 1 is not to be construed in a limiting sense upon this invention, as this invention could be practiced in networks having an architecture and topology that differs from that shown in FIG. 1. Further, the general concepts of this invention may be practiced as well in a TDMA-based mobile IP network, and is thus not limited for use only in a CDMA network. In general, this invention will find utility in wireless technologies where the MS context is partitioned into static and dynamic contexts. As such, while reading the ensuing description it should be noted that while some aspects of the description are specific to a CDMA network, such as the link layer PPP context, the description is not intended to be read in a limiting sense upon the implementation, use and practice of this invention.

The wireless communication system 1 shown in FIG. 1 includes at least one mobile station (MS) 10. The MS 10 may be or may include a cellular telephone, or any type of mobile terminal (MT) or mobile node (MN) having wireless communication capabilities including, but not limited to, portable computers, personal data assistants (PDAs), Internet appliances, gaming devices, imaging devices and devices having a combination of these and/or other functionalities. The MS 10 is assumed to be compatible with the physical and higher layer signal formats and protocols used by a network 12, and to be capable of being coupled with the network 12 via a wireless link 11. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 20 that is associated with a home access provider network of the MS 10. The MSC 14 is also coupled through an A1 interface (for circuit switched (CS) and packet switched (PS) traffic) and through an A5/A2 interface (CS services only) to a first radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data service node (PDSN) 28A and thence to an IP network 30 (via a Pi interface). The PDSN 28A is also shown coupled to a visited access, authorization and accounting (AAA) node 32 via a Pi and a remote authentication dial-in service (RADIUS) interface, that in turn is coupled to the IP network 30 via a RADIUS interface. Also shown coupled to the IP network 30 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 10 in this description) that tunnels datagrams for delivery to the mobile node when it is away from home, and that maintains current location information for the mobile node.

Also shown in FIG. 1 is a second RN 22B that is coupled to the first RN 22A via an A3/A7 interface. The second RN 22A includes a BS 24B and a PCF 26B and is coupled to a second PDSN 28B. The PDSN 28A and the PDSN 28B are coupled together through a P-P interface 29 (PDSN to PDSN interface, defined in IS835C).

For the purposes of description of this invention, and not by way of limitation, the first PDSN 28A is considered to be the anchor PDSN (a-PDSN), and the second PDSN 28B is considered to be the target PDSN (t-PDSN), for the MS 10. In like manner the associated BSs and PCFs can be assumed to be the anchor BS 24A and anchor PCF 26A, and the target BS 24B and target PCF 26B.

It should be noted, however, that there may be a plurality of BSs 24 connected to a single PCF 26 (defining a BS subnet), and that there may be a plurality of PCFs 26 within a given network all connected to a single PDSN 28. It may thus be the case that the source or anchor BS and the target BS may exist in the same BS subnet. Also, the source or anchor and target PCF may exist in the same network served by a single PDSN 28. The inter-BS and inter-PCF handoff scenarios that are encountered in this case are described in the above-captioned commonly assigned U.S. patent application Ser. No. 10/878, 455, filed on even date herewith and entitled "Method and Apparatus Providing Context Transfer for Inter-BS and Inter-PCF Handoffs in a Wireless Communication System", by Sarvesh Asthana and Jianhao Michael Yang.

As will be made apparent below, this invention defines a procedure to perform a Mobile IP inter-PDSN handoff by a combination of the P-P interface 29 and a generic hand over mechanism. This invention defines when to transfer context, and how to maintain the accuracy of the time sensitive contexts, and furthermore eliminates the need to maintain the P-P interface 29 after handoff. The use of this invention ensures the MS 10 packet interruption time is not greater than would result from the use of the conventional P-P interface 29 approach, i.e., the interruption period is not more than the time required for the MS 10 to perform the physical layer switching from RN 22A to RN 22B. The use of this invention also eliminates the above-mentioned triangle routing problem associated with the P-P interface 29.

Figure 2A:
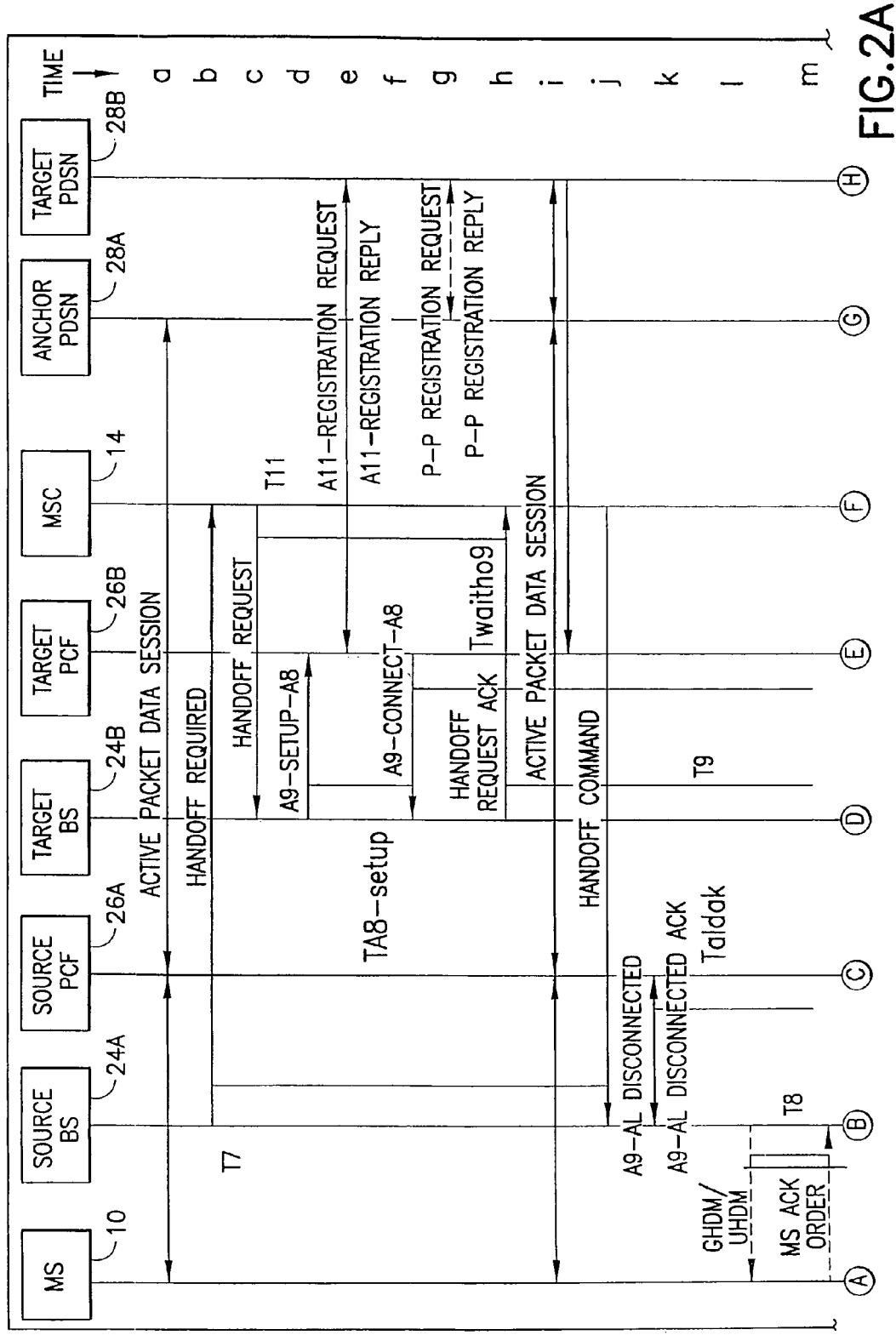

When the MS 10 encounters an inter-PDSN handoff, the procedure specified by this invention addresses both the fast handoff and context transfer considerations. The MS 10 preferably follows the fast handoff procedure defined in 3GPP2, referring to FIG. 3.19.4.2-1 of 3GPP2 A.S0013-A v2.0.1, and reproduced herein for convenience as FIG. 2.

Figure 3:
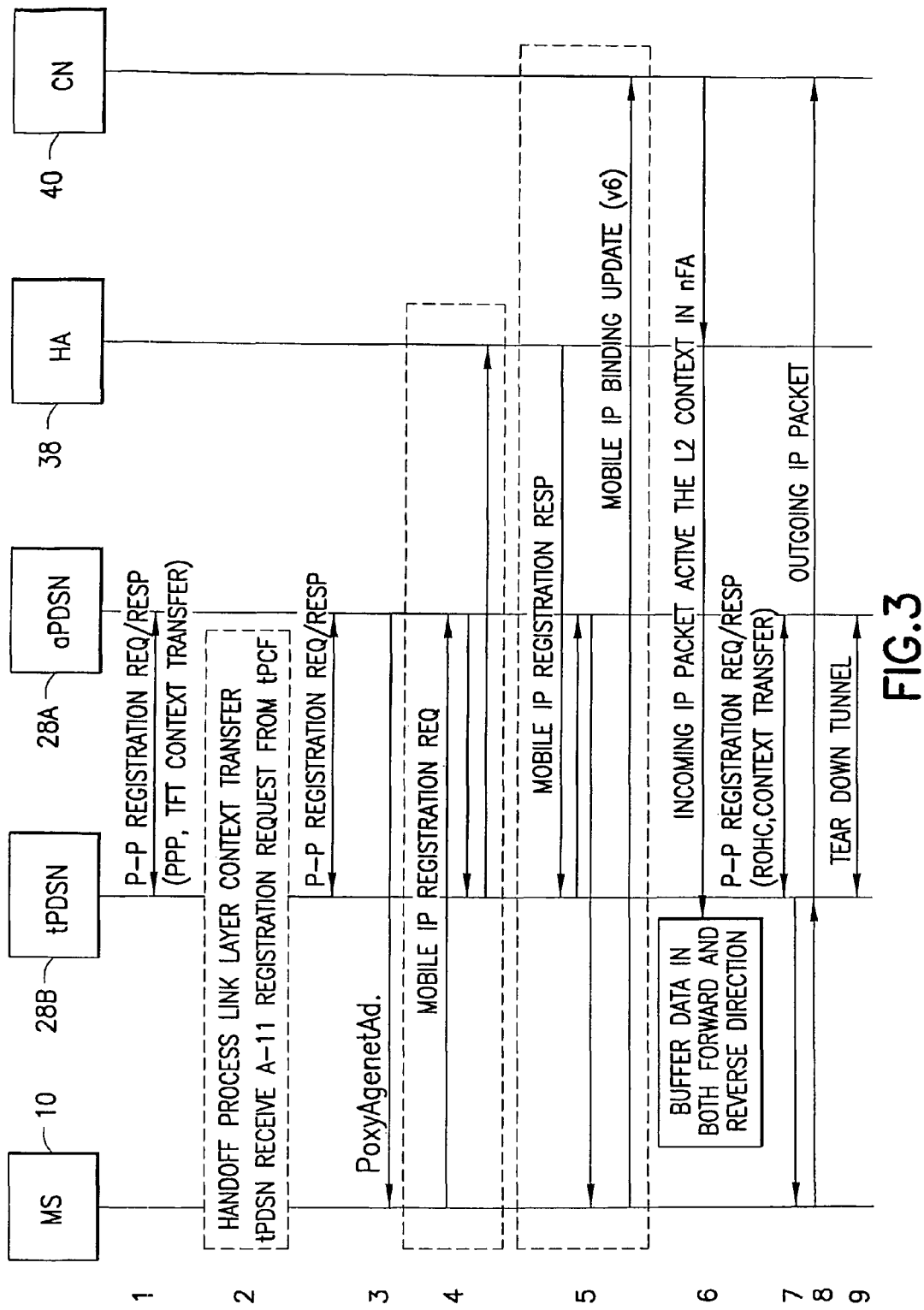
FIG. 3 is a diagram that illustrates the messages that pass between various ones of the network nodes and elements of FIG. 1, in accordance the inter-PDSN context transfer technique in accordance with an exemplary embodiment of this invention.

Reference is now also made to FIG. 3 for showing the improved inter-PDSN handoff in accordance with an exemplary embodiment of this invention. FIG. 3 may also be viewed as a logic flow diagram that is illustrative of methods in accordance with exemplary embodiments of this invention. The steps or procedures employed by this exemplary embodiment of this invention are sequentially numbered for convenience as 1-9, as shown on the left side of the diagram of FIG. 3, and correspond to the numbered paragraphs 1-9 below. Note that FIG. 3 also introduces a correspondent node (CN) 40, which is a node with which the MS 10 is communicating over a transport connection (UDP (user datagram protocol) or TCP (transport control protocol)). As defined in RFC3220, a correspondent node is a peer with which the mobile node (the MS 10 in this description) is communicating, and may be either mobile or stationary. Note also in FIG. 3 that the reference to L2 is a reference to layer 2, and refers to the link layer which, for a CDMA 2000 network, refers to the PPP connection that is setup. For reference purposes, L1 refers to layer 1, or the physical layer which, for a CDMA 2000 network, refers to the CDMA traffic channel setup and the Radio Link Protocol (RLP) synchronization.

1. When the P-P procedure is established, data follows the path as defined by the P-P interface 29: the PPP frame is tunneled through the target PDSN 28B to the anchor PDSN 28A, and the MS 10 still has the original care-of IP address as assigned by the anchor PDSN 28A. An existing active application continues regardless of the steps described below. After the P-P interface 29 is established, the anchor PDSN 28A transfers the PPP context and the TFT context to the target PDSN 28B. At this point, however, the target PDSN 28B does not activate the PPP context, but waits until a later step. It can be noted that, as was described above, the PPP and TFT contexts are examples of static, time insensitive contexts.

2. The MS 10 then performs a hard handoff (steps j to x in FIG. 2). During these steps, the link layer type 4 context can be transferred in accordance with the above captioned commonly assigned U.S. patent application Ser. No. 10/878,455, filed on even date herewith and entitled "Method and Apparatus Providing Context Transfer for Inter-BS and later-PCf Handoffs in a Wireless Communication System", by Sarvesh Asthana and Jianhao Michael Yang.

3. After the target PDSN 28B and the anchor PDSN 28A exchange the P-P Registration Update, the anchor PDSN 28B sends a message to tear down the R-P connection with the source (anchor) PCF 26A. It also sends a Proxy Router Advertisement message to the MS 10, through the tunnel established in the P-P interface 29. This serves as a movement detection indication to the MS 10 to start the Mobile IP registration process. The Proxy Router Advertisement message is preferably based on a standard Agent Advertisement message as defined in RFC3220. The care-of-address in the Mobility Agent Advertisement Extension is set to the care-of-address of the target PDSN 28B. The overall format of the Proxy Router Advertisement message need not be modified from that defined in RFC3220.

4. In response to receiving the Proxy Router Advertisement message, MS 10 performs Mobile IP Registration with the target PDSN 28B. Note that the Registration Request message will end in the anchor PDSN 28A first, as that is the end point of the current PPP session. The anchor PDSN 28A routes the Mobile IP Registration Request message to the target PDSN 28A.

5. The target PDSN 28B performs the Mobile IP registration for the MS 10, and replies to the Registration Request of the MS 10 with a newly assigned care-of address that corresponds to the target PDSN 28B. For Mobile IPv6, the MS 10 sends a binding update to its HA 38, or to the CN 40. This action effectively causes future incoming packets to be routed to the target PDSN 28B. For Mobile IPv4, the binding update is not needed since the foreign agent (not shown in FIG. 1) updates the binding with the HA 38. In accordance with RFC3220 the foreign agent is a router on a visited network of the mobile node (the MS 10 in this description) which provides routing services to the mobile node while registered, and which de-tunnels and delivers datagrams to the mobile node that were tunneled by the HA 38 of the mobile node.

6. When the first packet destined for the MS 10 reaches the target PDSN 28B, it is clear that there is no need for further IP packets for this session to reach the anchor PDSN 28A. This IP packet instead goes though the TFT contexts that were transferred at Step 2. From the TFT contexts the target PDSN 28B determines at this time that the anchor PDSN 28A should transfer the type 3 contexts (header compression information for example). To do this, the target PDSN 28B buffers the IP packet, and sends a P-P Registration Request to the Anchor PDSN 28A. The anchor PDSN 28A then includes the type 3 context information in the P-P Registration Response message back to the target PDSN 28B. These contexts can be assumed to be up-to-date. If the TFT determines that the packet needs to be compressed, the target PDSN 28B can apply the header compression context to that packet before sending it to the (target) BS 24B for delivery to the MS 10.

7. At this time the target PDSN 28B also activates the PPP context obtained in Step 2, and forwards the packet to the MS 10 via the target BS 24B. Henceforth, packets in the forward direction (to the MS 10) do not go through the anchor PDSN 28A. Similarly, the target PDSN 28B no longer forwards packets to the anchor PDSN 28A.

8. Packets sent in the reverse direction (from the MS 10) are also buffered when the target PDSN 28B is obtaining contexts from the anchor PDSN 28A. This is to ensure that the contexts from the anchor PDSN 28A are always up-to-date. As an estimated turn-around time for the context transfer from the anchor PDSN 28A to the target PDSN 28B is less than about 40 ms, the packet buffer need only be sized to buffer about one or two packets.

9. At this point in time the target PDSN 28B may begin to tear down the P-P interface 29 with the anchor PDSN 28A.

It should be noted that the procedure described above in reference to FIG. 3 is preferably used for Mobile IP operation. For simple (non-mobile) IP operations the use of this invention is not presently preferred, as a new PPP session always results in a new IP address, and hence interruption of the operation of the application is inevitable.

Advantages that are realized by the use of the foregoing procedure are several. For example, the use of this procedure eliminates the need to maintain the P-P interface 29 during the active application session. This releases network 12 resources and eliminates the triangle routing issue associated with the conventional use of the P-P interface tunnel. Another advantage that is realized by the use of this invention is the elimination of packet loss during PPP establishment, such as is experienced when only the conventional generic fast handover mechanism is used. The use of this invention also does not introduce additional packet loss on top of the P-P interface 29 procedure, and no context information is lost during the inter-PDSN handoff since the procedure in accordance with the preferred embodiments of the invention ensures that the state information is up-to-date, accurate, and is synchronized with the first MS 10 packet that reaches the target PDSN 28B. Another significant advantage of the use of this invention is that minimal software changes are required at the MS 10, and substantially all required changes can be localized at the PDSN 28. In addition, only a modest change to the Proxy Router Advertisement message is made to include a new bit for instructing the MS 10 to perform the Mobile IP registration (see steps 3, 4 and 5 above).

Figure 4:
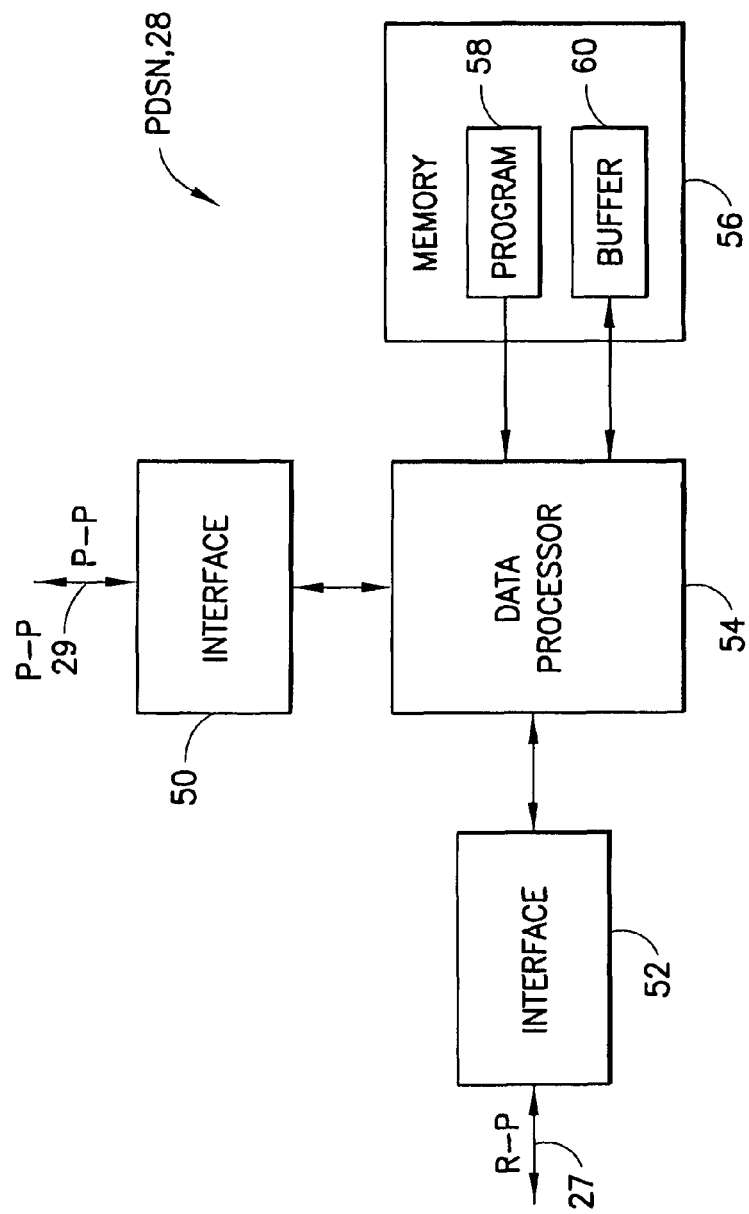
FIG. 4 is a simplified block diagram of a PDSN in accordance with an exemplary embodiment of this invention.

Based on the foregoing description, and referring to FIG. 4, it can be appreciated that an aspect of this invention is a PDSN 28 that is operable with a MS 10 during an inter-PDSN handoff procedure. The PDSN 28 is operable during the handoff procedure as either the anchor PDSN 28A or the target PDSN 28B. As is shown in FIG. 4, the PDSN 28 includes a first interface 50 for use in establishing the P-P interface 29 with another PDSN; a second interface 52 for use in establishing the R-P interface 27 with the PCF 26 of an associated RN 22 and at least one data processor 54 coupled to a memory 56 wherein there are stored computer program instructions 58 that are executable by the at least one data processor 54 to cause the at least one data processor 54 to establish the P-P interface 29 with another PDSN 28, and to one of transfer MS 10 static context to the target PDSN 28B or to receive MS 10 static context from the anchor PDSN 28A, including the PPP contexts. When functioning as the target PDSN 28B, the data processor 54 operates to send a Proxy Router Advertisement message to the MS 10 through the P-P interface 29, where the Proxy Router Advertisement message includes as the care-of-address the IP address of the target PDSN 29. The Proxy Router Advertisement message is intended to trigger the MS 10 to perform the Mobile IP Registration with the target PDSN 28B and, in response to fulfilling the Mobile IP Registration Request for the MS 10, when functioning as the target PDSN 28B the data processor 54 sends the MS 10 a newly assigned care-of address that corresponds to the target PDSN 28B. When functioning as the target PDSN 28B, the data processor 54 is responsive to a first datagram destined for the MS 10 reaching the PDSN 28B to store in a buffer 60 the received datagram(s) and to also receive dynamic contexts from the anchor PDSN 28A. The data processor 54 is further responsive to the stored program instructions 58 to activate, when functioning as the target PDSN 28B, the static context previously received from the anchor PDSN 28A, and to cause to be forwarded from the buffer 60 any buffered datagram(s) to the MS 10, via the R-P interface 27 to the target RN 22B, in accordance with all MS-related static and dynamic contexts.

It can be appreciated that this invention provides a procedure that addresses the deficiencies in conventional inter-PDSN handoff techniques. In the approach of this invention contexts are transferred at an appropriate time depending on the context type. A result is that link layer (PPP) delay can be substantially eliminated during Mobile IP handoff without introducing additional packet loss. As the MS 10 contexts are maintained during the handoff procedure, any executing applications are not impacted by the inter-PDSN handoff.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent message names, message formats, types of static and dynamic contexts, and network 12 elements and functions may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
    in response to handoff of a mobile station from an anchor radio network associated with an anchor packet data serving node to a target radio network associated with a target packet data serving node, buffering a datagram destined for the mobile station that is received in the target packet data serving node;
    receiving dynamic contexts in the target packet data serving node that are transferred from the anchor packet data serving node; and
    after the handoff has been performed, forwarding the buffered datagram to the mobile station via the target radio network;
    where prior to receiving the dynamic contexts, the method comprises receiving static contexts in the target packet data serving node from the anchor packet data serving node;
    where the dynamic contexts are received in the target packet data serving node from the anchor packet data serving node subsequent to the datagram being buffered by the target packet data serving node; and
    where the buffered datagram is forwarded to the mobile station from the target packet data serving node in accordance with the dynamic contexts and with the static contexts received from the anchor packet data serving node.

2. The method as in claim 1, where the dynamic contexts comprise header compression information.

3. The method as in claim 1, where the static contexts comprise traffic flow template information.

4. A non-transitory computer-readable medium comprising program instructions tangibly embodied thereon, where execution of the program instructions by at least one data processor results in the performance of method steps comprising:
    in response to handoff of a mobile station from an anchor radio network associated with an anchor packet data serving node to a target radio network associated with a target packet data serving node, buffering a datagram destined for the mobile station that is received in the target packet data serving node;
    receiving dynamic contexts in the target packet data serving node that are transferred from the anchor packet data serving node; and
    after the handoff has been performed, forwarding the buffered datagram to the mobile station via the target radio network;
    where prior to receiving the dynamic contexts, the method comprises receiving static contexts in the target packet data serving node from the anchor packet data serving node;
    where the dynamic contexts are received in the target packet data serving node from the anchor packet data serving node subsequent to the datagram being buffered by the target packet data serving node; and
    where the buffered datagram is forwarded to the mobile station from the target packet data serving node in accordance with the dynamic contexts and with the static contexts received from the anchor packet data serving node.

5. The non-transitory computer-readable medium as in claim 4, where the dynamic contexts comprise header compression information.

6. The non-transitory computer-readable medium as in claim 4, where the static contexts comprise traffic flow template information.

7. An apparatus, comprising a processor; and a memory including computer program code, where the memory and computer program code are configured, with the processor, to cause the apparatus, in response to handoff of a mobile station from an anchor radio network associated with an anchor packet data serving node to a target radio network associated with a target packet data serving node, to buffer a datagram destined for the mobile station that is received in the target packet data serving node; to receive dynamic contexts in the target packet data serving node that are transferred from the anchor packet data serving node; and after the handoff has been performed, to forward the buffered datagram to the mobile station via the target radio network;

where the apparatus is further configured, prior to receiving the dynamic contexts, to receive static contexts in the target packet data serving node from the anchor packet data serving node;

where the dynamic contexts are received in the target packet data serving node from the anchor packet data serving node subsequent to the datagram being buffered by the target packet data serving node; and where the apparatus is further configured to forward the buffered datagram to the mobile station from the target packet data serving node in accordance with the dynamic contexts and with the static contexts received from the anchor packet data serving node.

8. The apparatus as in claim 7, where the dynamic contexts comprise header compression information.

9. The apparatus as in claim 7, where the static contexts comprise traffic flow template information.

\* \* \* \* \*